(12) United States Patent
Wobben

(10) Patent No.: US 6,371,730 B1
(45) Date of Patent: Apr. 16, 2002

(54) CONNECTION OF A WIND ENERGY PLANT ROTOR BLADE TO A ROTOR HUB

(76) Inventor: Aloys Wobben, Argestrasse 19, Aurich (DE), D-26607

( * ) Notice: Subject to any disclaimer, the term of this patent is extended or adjusted under 35 U.S.C. 154(b) by 0 days.

(21) Appl. No.: 09/445,127
(22) PCT Filed: Jun. 6, 1998
(86) PCT No.: PCT/EP98/03402
  § 371 Date: Mar. 3, 2000
  § 102(e) Date: Mar. 3, 2000
(87) PCT Pub. No.: WO99/06694
  PCT Pub. Date: Feb. 11, 1999

(30) Foreign Application Priority Data

Aug. 1, 1997 (DE) .......................................... 197 33 372

(51) Int. Cl.[7] .............................................. F04D 29/34
(52) U.S. Cl. ............................ 416/244 R; 416/204 R
(58) Field of Search ....................... 416/244 R, 244 A, 416/204 R

(56) References Cited

U.S. PATENT DOCUMENTS 4,260,332 A  4/1981  Weingart et al.
4,915,590 A  4/1990  Eckland et al.

FOREIGN PATENT DOCUMENTS

| DE | 31 03 7 10 C2 | 3/1983 |
| DE | 31 09 566 C2 | 4/1983 |
| DE | 29 37 895 C2 | 7/1986 |
| EP | 0 664 269 A1 | 7/1995 |
| FR | 565.621 | 1/1924 |

OTHER PUBLICATIONS

Erich Hau, "Windkraftanlagen", 1988, pp. 203–213.

*Primary Examiner*—John Kwon
(74) *Attorney, Agent, or Firm*—Merchant & Gould P.C.

(57) ABSTRACT

The invention relates to a rotor blade in a wind energy plant, comprising at least one recess arranged in the area of the base (6) of the rotor blade and extending substantially perpendicular to the longitudinal axis of said rotor blade (6) to accommodate a cross-bolt (16,18) which can be joined to a traction element (20,22) to enable connection of the rotor blade (6) to a rotor hub (11) in a wind energy plant (1). The invention further relates to a rotor for a wind energy plant, comprising a rotor hub (11) and at least one rotor blade (6) secured to said hub (11), in addition to a wind energy plant. The invention is characterized in that the recess only partially crosses through the rotor blade.

12 Claims, 2 Drawing Sheets

CONNECTION OF A WIND ENERGY PLANT ROTOR BLADE TO A ROTOR HUB

Figure 1:
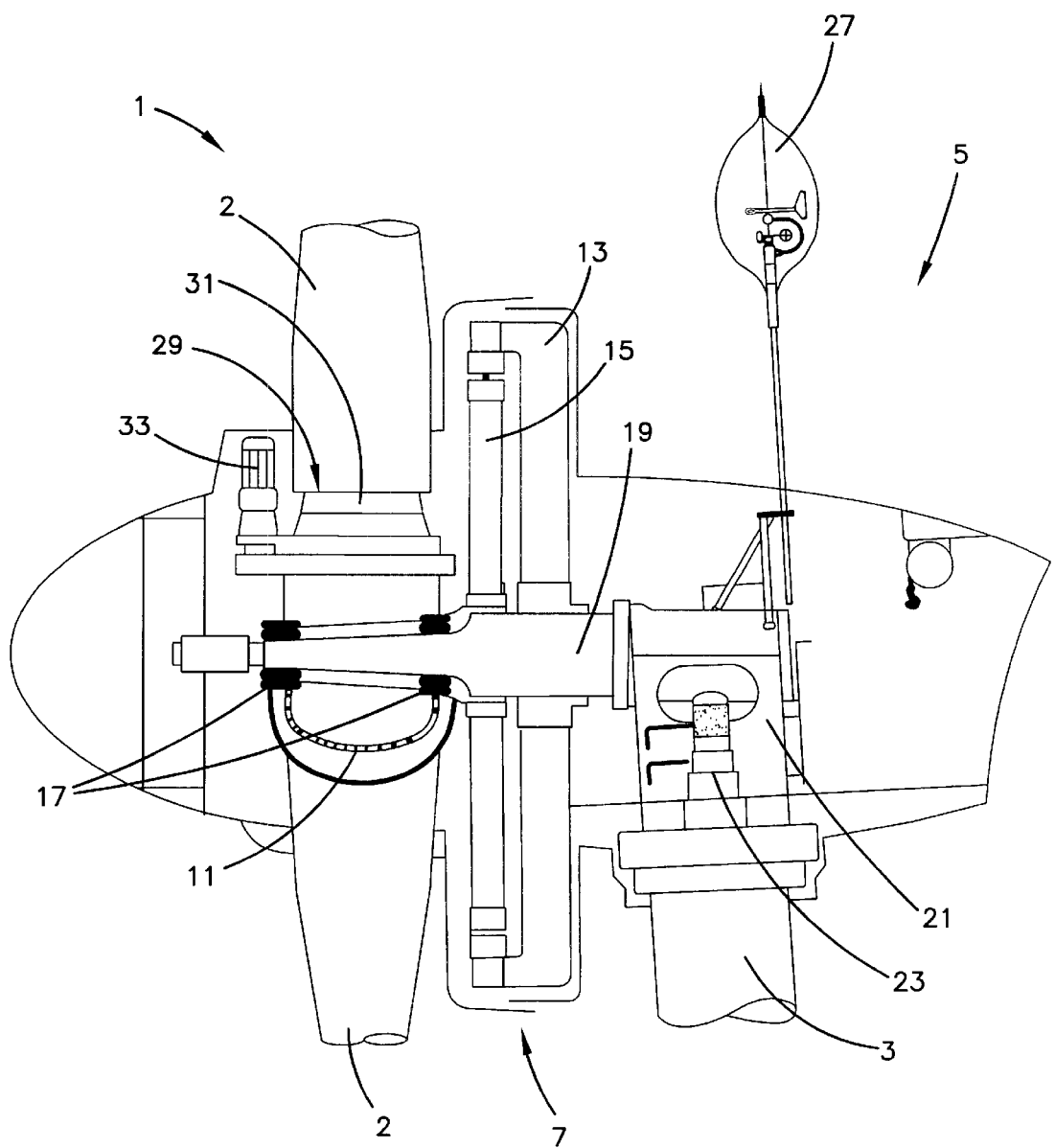

The present invention concerns a rotor blade for a wind energy plant, with at least one recess, arranged in the region of the rotor blade base and extending essentially transversely to the longitudinal access of the rotor blade, for accommodating a cross bolt, which can be coupled to a tensioning element for the connection of the rotor blade to a rotor hub of a wind energy plant.

The invention further concerns a rotor for a wind energy plant with a rotor hub and at least one rotor blade fastened to the rotor hub, as well as a wind energy plant with such a rotor.

A rotor blade as well as such a rotor for a wind energy plant, of the type named in the introduction, are known. They find application, for example, in a wind energy plant with the designation AEOLUS II, which was developed as an experimental plant by Messerschmidt-Bölkow-Blonm (MBB) ("Windkraftanlagen", Erich Hau, $2^{nd}$ ed., Springer-Verlag, Berlin, Heidelberg, New York, ISBN 3-540-5743-1, p. 203).

With wind energy plants, the fastening of the rotor blades, which are subjected to considerable forces, to the shaft of the wind energy plant, which is coupled to the generator, is a general problem, since due to the forces acting upon the rotor the components used are exposed to extreme stresses. The structural form of the so-called rotor blade connection is thus of great significance.

With one known wind energy plant, the rotor blade, consisting of a compound material, is connected in the region of the so-called rotor blade base, i.e. in the rotor blade's end region that is to be coupled to the rotor hub, to a metallic flange that consists of an inner and outer ring flange; in this, the rotor blade base is set between the inner and the outer ring flange and is fastened by means of an adhesive and a threaded connection. For the producing of the threaded connection, a bolt is inserted through a passage bore, which passes completely through the rotor blade, into the rotor blade and screwed. The flange is screwed to the rotor hub at its end opposite to the rotor blade base. This construction of the rotor blade connection is relatively complicated and heavy structurally, since the metallic flange has a high weight. Especially disadvantageous is the fact that the rotor blade is significantly weakened in the region of the rotor blade base by the passage bore for receiving the bolt.

An additional, known wind energy plant displays as the rotor blade connection a steel flange joint, in which the rotor blade base is clamped between an inner and an outer flange and the two flanges are screwed together. The joining of the two flanges with the rotor hub takes place by means of a spaced-apart flange ring, with the aid of high-strength expansion screws. In this construction the metallic flanges contribute very often up to a third to the total weight of the rotor blade. Furthermore, the force progression is unfavorable, due to a radial offset between the rotor blade base and the spaced-apart flange, since this leads to an undesired lever effect.

In the case of the above mentioned experimental AEOLUS II, a so-called cross-bolt connection is used, in which the so-called cross bolts are arranged in passage bores in the region of the rotor blade base (i.e. the hub-side end region of the rotor blade), which passage bores are formed in the rotor blade and pass completely through the latter. The cross bolts arranged inside the passage bores are laminated into the rotor blade and serve as anchoring elements inside the rotor blade. The cross bolts are in each case connected to a tensioning element, formed as a bolt-shaped tension rod, that is screwed together with the rotor hub. By means of the tensioning element, which is subjected to tension, the rotor blade is pressed against the hub and thus held. In this construction it is likewise especially disadvantageous that the rotor blade is greatly weakened in the region of the rotor blade base by the passage bores for receiving the cross bolts. Furthermore, the force progression in the region of the flange-like rotor hub is unfavorable.

The task of the present invention consists in specifying a rotor, a rotor blade, and a wind energy plant, in which the disadvantages of the prior art are to a large extent avoided, and which have an easily producible and secure connection between the rotor blade and the rotor hub, which connection is able to withstand extreme stresses.

According to the invention, this task is accomplished in a rotor blade as well as a rotor of the type named in the introduction by the fact that the recess passes only partially through the rotor blade.

By means of the design, in accordance with the invention, of a recess that passes not completely, but rather only partially, through the rotor blade, the rotor blade is weakened in the region of the rotor blade base to a substantially lesser degree than is the case with the prior art, in which provision is made for a passage bore that passes completely through the rotor blade for receiving the cross bolt. Achieved according to the invention is the fact that the rotor blade, by virtue of the reduced material weakening, can withstand greater stresses with comparable structural size. A rotor blade is thus more securely fastened to a hub of a wind energy plant, and the structural size of the rotor blade connection can be kept relatively small, so that it can be built so as to be comparatively light. The rotor blade connection according to the invention withstands in a lasting manner the extreme stresses to which the rotor blade and the rotor hub are subjected in the region of the rotor blade base.

With the use in particular of fiber-reinforced epoxy-resin compound material as a lighter and at the same time more robust material for rotor blades, a durable anchoring of the cross bolts in the rotor blade base can be realized. In this case there results a favorable introduction of force from a cross bolt to the epoxy-resin compound material of the rotor blade.

An especially preferred implementation of the rotor blade according to the invention and of the rotor blade is characterized by the fact that the recess is formed as a pocket hole. In this way, the recess can be formed in the rotor blade in a particular simple manner from the outside. A further advantage results from the fact that the cross bolts, which in the assembled state are arranged inside the pocket holes accessible from the outside, can, if need be, be replaced without any damage to the rotor blade being necessary.

Provision can advantageously be made in the rotor blade for several spaced-apart pocket holes for receiving several cross bolts, since thereby the strength of the rotor blade connection can be substantially increased, which is necessary in particular in the case of very large wind energy plants. The pocket holes can be spaced in such a manner that the material is only insignificantly weakened by the pocket holes.

Especially preferable is an implementation of the invention in which the rotor blade has an enlarged cross section in the region of the rotor blade base and the pocket holes or holes is/are arranged in the region of the enlarged cross section. Also, through this measure the load capacity of the connection between rotor blade and rotor hub can be significantly increased, since the rotor blade, due to the enlargement of the cross section in the region of the rotor base, is subjected to substantially smaller stresses and can therefore be impinged upon by greater forces. By means of the arrangement, according to the invention, of the pocket holes in the region of the enlarged cross section, a favorable introduction of force from the cross bolts to the material of the rotor blade is possible, while a substantially lesser surface pressure occurs at the contact surface between the cross bolts and the inner surface of the recess.

According to an especially preferred implementation form of the invention, the cross section of the rotor blade is enlarged on both sides in the direction of a hub-side end section of the rotor blade. In this way a symmetrical introduction of force from the cross bolts into the robust rotor blade is realized. According to a further development of this implementation example, the rotor blade displays two opposite-lying thickening sections, in each case formed as one piece with the rotor blade, and the pocket holes are arranged at least partially in the region of a thickening section. The thickening sections, which contribute to the cross section enlargement, can be formed in a simple manner through the laminating on of several layers of fiber laminate material and epoxy resin.

Especially preferred, furthermore, is an implementation form in which the rotor blade displays in the region of the rotor blade base an essentially pipe-shaped end section, in which several pocket holes are formed on the inside and outside. A pipe-shaped end section can be attached to the rotor hub in an especially uniform and simple manner and is of particular advantage in the case of very large wind energy plants, in which extreme forces appear, the rotor blades of which transition from the pipe-shaped end section for attachment into a wing-profile section.

A further development is characterized through several bores, each joined with a pocket hole and extending essentially in the direction of the longitudinal axis of the rotor blade, for receiving in each case a tensioning element that can be connected to a cross bolt. In this manner the tensioning elements are advantageously arranged partially inside the rotor blade in the bores and can at the same time engage a bore that is arranged centrally in the cross bolts and provided with a tread, so that the cross bolts are impinged upon by the tensile force in a symmetrical manner and are arranged inside the rotor blades essentially free of moments.

A favorable introduction of force and a high strength result when the pocket hole or holes is/are essentially cylindrical and display a depth that is approximately equal to a third of the cross section of the rotor blade in the region of the rotor blade base.

A great lightness of material combined with a high degree of strength results from an implementation form in which the rotor blade consists mainly of a glass-fiber-reinforced epoxy-resin compound material.

The previously explained advantages of a rotor blade according to the invention result in a similar way from a rotor for a wind energy plant of the type mentioned in the introduction, which plant is equipped with a rotor blade according to the invention. In order to avoid repetition, therefore, with respect to these advantageous effects reference is made to the foregoing exposition.

A preferred further development of the rotor according to the invention is distinguished by the fact that the rotor hub displays a rotary, in cross section essentially T-shaped flange section for the connecting of the rotor blade and that the rotor blade is screwed to the flange section by means of several tensioning elements, which are connected in each case to a cross bolt anchored on the rotor blade. Through the advantageous symmetrical T-shaped flange section a symmetrical force introduction from a rotor blade to the hub can be realized, since formed in the two open sections of the T-shaped flange section, lying essentially in one plane, are the passage bores through which the tensioning elements project. Advantageously, the several tensioning elements are arranged parallel to each other in pairs and essentially in two rows that are concentric with each other. In this, the tensioning elements lying opposite each other in pairs can lie directly opposite or staggered with respect to the tensioning elements of the other row.

The advantages according to the invention are also realized by a wind energy plant that is equipped with a rotor and/or a rotor blade of the above-described type; with respect to the advantages according to the invention that are attainable thereby, reference is made to the foregoing explanations in connection with a rotor blade and rotor according to the invention.

Figure 2:
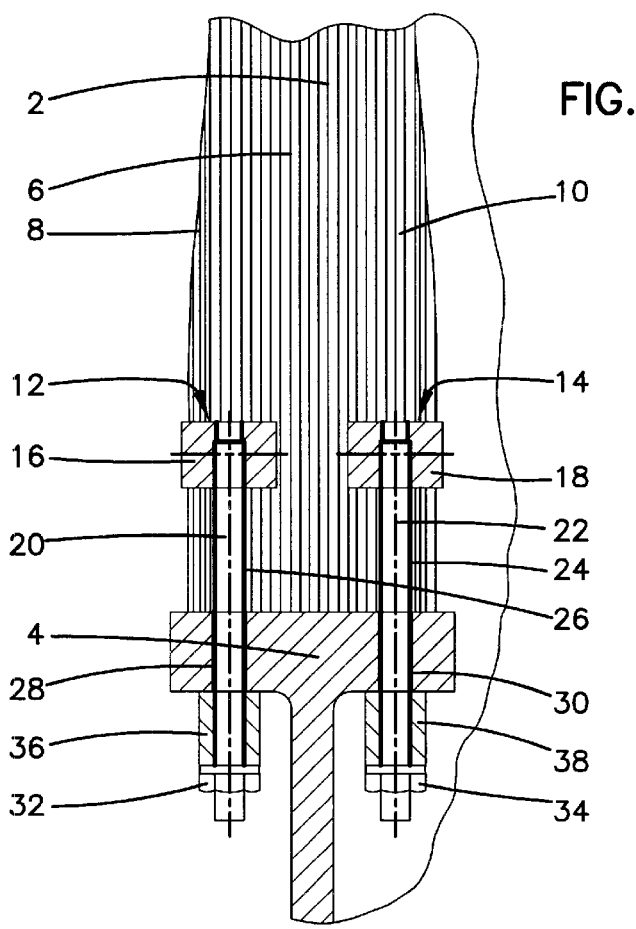

The invention is described in the following in the context of an implementation example of a rotor of a wind energy plant, with reference to the accompanying drawings. They show:

FIG. 1: a schematic representation of a wind energy plant according to the invention FIG. 2: a sectional representation of the attachment, according to the invention, of a rotor blade to a rotor hub of a wind energy plant (rotor blade connection)

Figure 3:
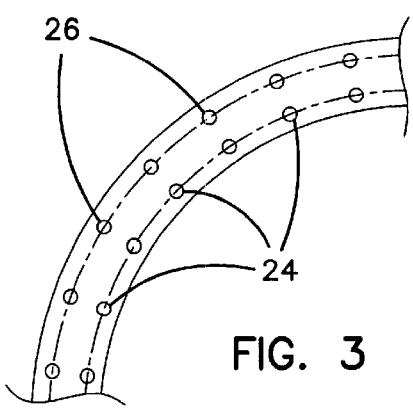

FIG. 3: a schematic view of an end section of the rotor blade, according to the invention, from FIG. 1

Figure 4:
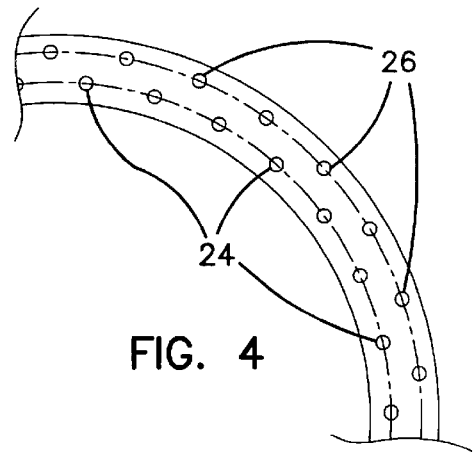

FIG. 4: a further schematic view of an end section of an alternative implementation example of a rotor blade according to the invention The wind energy plant 1 represented in FIG. 1 comprises in essence a tower 3 and a pod 5 attached to the latter for accommodating a generator 7 as well as a rotor 9 connected directly to the generator. The rotor 9 displays a rotor hub 11 as well as, for example, three rotor blades 2 fastened to the rotor hub 11. Through the wind force acting upon the rotor blade 2, the rotor hub 11 is rotated in order to drive the generator 7.

The generator 7, formed as a ring generator, displays a stator 13 and a rotor 15. The rotor 15, together with the rotor hub 11, is supported on support pin 19 by means of main supports 17, which support pin is firmly connected to a machine carrier 21. The machine carrier 21 is mounted on the tower 3 so as to be swingable by means of an azimuth motor 23. Also attached to the machine carrier 21 is a wind gauge 27.

FIG. 2 shows in a sectional representation a section of a rotor blade 2 of a wind energy plant 1, which, for example, can be a matter of a so-called horizontal-axis wind energy plant.

The rotor blade 2 represented in partial view in FIG. 2 is produced in a structurally light manner from a fiber-reinforced epoxy-resin compound material and is firmly connected to the rotor hub 11 by means of a rotor blade connection 29 (FIG. 1) in accordance with the invention, the rotor blade 2 being firmly screwed to a rotary flange section 4, essentially T-shaped in cross section, which in turn is rigidly joined to the rotor hub 11. The section of the rotor blade 2 represented in FIG. 1 is—just as the flange section 4—formed in an essentially rotary and pipe-shaped manner, and transitions, with increasing distance from the rotor hub 11, into the wing profile, which is not represented. Arranged between the rotor blade connection 29 and the rotor hub 11 is a blade adapter 31. With the aid of a blade adjustment motor, a rotor blade 2, together with a blade connection 29 and a blade adapter 31, can be rotated around a longitudinal axis of the rotor blade 2.

FIG. 2 illustrates the two-sided enlargement, according to the invention, of the cross section or thickening of the rotor blade 2 in the region of the rotor blade base 6, i.e. in the implementation example the end region of the essentially pipe-shaped section of the rotor blade 2, which in the assembled state is connected to the flange section 4 of the rotor hub 11. Formed onto opposite side-regions of the rotor blade base 6 are thickening sections 8, 10, which provide an enlargement of the cross section of the rotor blade 2 in the direction of the end region of the rotor blade 2 in the region of the rotor blade base 6. Through the enlarged cross section due to the thickening sections 8, 10 formed on both sides of the rotor blades 2, a great degree of strength is achieved in that area. The thickening sections 8, 10 can be produced, for example, through the application of additional epoxy-resin and fiber layers.

Provision is made in the region of the rotor blade base 6 for several recesses in the form of pocket holes 12, 14, which recesses pass through the rotor blade not completely, but only partially; the pocket holes have a cylindrical form and extend from the surface into the interior of the rotor blade 2. The cylindrical pocket holes 12 have a depth that corresponds to approximately a third of the entire (cross-sectional) thickness of the rotor blade 2 in the region of the rotor blade base 6.

Arranged inside and laminated into the pocket holes 12, 14 are metallic cross bolts 16, 18 as anchoring elements inside the rotor blade 2. The cross bolts 16, 18 display in each case a passage bore provided with an inner thread. They work together with tensioning elements 20, 22 in the form of cylindrical bolts made of metal; an outer thread of the tensioning elements 20, 22 is screwed into the inner thread of the cross bolts 16, 18.

The tensioning elements 20, 22 in each case extend through a bore 24, 26 arranged inside the rotor blade 2, as well as through a bore 28, 30 inside the flange section 4. By means of a nut 32, 34 that can be screwed onto the outer thread of the tensioning elements 20, 22 and the interpositioning of a sleeve 36, 38, the tensioning elements 20, 22 can be acted up with great tensile forces and thus the rotor blade 2 can be drawn tightly to the flange section 4 and thereby to the rotor hub 11, so that a firm connection between rotor blade 2 and rotor hub 11 is brought about.

FIG. 3 shows a view of the rotor blade 2 according to a first implementation example of the invention represented in FIG. 2, in which several tensioning elements 20, 22 (FIG. 2) are arranged in each case in pairs that are spaced apart from one another in concentric rows. Seen in FIG. 3 are the bores 24, 26 in the rotor blade 2, arranged along two concentric, circular rows.

FIG. 4 shows and alternative implementation example of the invention, in which the bores 24, 26 and thus also the tensioning elements 20, 22 and the cross bolts 16, 18 are arranged likewise in two essentially concentric rows along the pipe-shaped rotor blade base 6, the two rows being staggered with respect to each other.

What is claimed is:

1. Rotor blade for wind energy plant, with at least one recess, arranged in the region of the rotor blade base and extending essentially transversely to the longitudinal axis of the rotor blade, for receiving a cross bolt, which is connected to a tensioning element for the attachment of the rotor blade to a rotor hub of a wind energy plant, wherein each recess only partially passes through the rotor blade and is formed as a pocket hole.

2. Rotor blade according to claim 1, characterized by the fact that the rotor blade displays an enlarged cross section in the region of the rotor blade base and that at least one pocket hole is arranged in the region of the enlarged cross section.

3. Rotor blade according to claim 2, characterized by the fact that the cross section of the rotor blade is enlarged on both sides in the direction of a hub-side end section of the rotor blade.

4. Rotor blade according to claim 3, characterized by the fact that the rotor blade displays two opposite thickening sections formed as one piece with the rotor blade and that the pocket holes are arranged at least partially in the region of the thickening sections.

5. Rotor blade according to claim 1, characterized by the fact that the rotor blade displays in the region of the rotor blade base an essentially pipe-shaped end section, in which are formed on the inside and outside several pocket holes.

6. Rotor blade according to claim 1, characterized through several bores connected in each case with a pocket hole and extending essentially in the direction of the longitudinal axis of the rotor blade, for receiving in each case a tensioning element that is connectable to a cross bolt.

7. Rotor blade according to claim 1, characterized by the fact that the pocket hole or holes is/are essentially cylindrical in shape and has/have a depth that corresponds approximately to a third of the cross section of the rotor blade in the region of the rotor blade base.

8. Rotor blade according to at least one of the preceding claims, characterized by the fact it consists mainly of a glass-fiber-reinforced epoxy-resin compound material.

9. Rotor for a wind energy plant, with a rotor hub and at least one rotor blade fastened to the rotor hub, characterized by the fact that at least one rotor blade is formed with at least one recess, arranged in the region of the rotor blade base and extending essentially transversely to the longitudinal axis of the rotor blade, for receiving a cross bolt, which is connected to a tensioning element for the attachment of the rotor blade to a rotor hub of a wind energy plant, wherein each recess only partially passes through the rotor blade and is formed as a pocket hole.

10. Rotor according to claim 9, characterized by the fact that the rotor hub displays a rotary flange section, essentially T-shaped in cross section, for the connection of the rotor blade and that the rotor blade is screwed to the flange section by means of several tensioning elements, which are connected in each case to a cross bolt anchored on the rotor blade.

11. Rotor according to claim 10, characterized by the fact that the several tensioning elements are arranged parallel to each other in pairs and in two essentially concentrically arranged rows.

12. Rotor according to claim 11, characterized by the fact that the tensioning elements of the one row are arranged so as to be displaced in relation to the tensioning elements of the other row.

\* \* \* \* \*